US006978192B2

(12) United States Patent
Wisniewski

(10) Patent No.: US 6,978,192 B2
(45) Date of Patent: Dec. 20, 2005

(54) SINGLE PASS SEQUENCER AND METHOD OF USE

(75) Inventor: Michael Wisniewski, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/815,763

(22) Filed: Apr. 2, 2004

(65) Prior Publication Data

US 2005/0222708 A1 Oct. 6, 2005

(51) Int. Cl.[7] .................................................. G06F 7/00
(52) U.S. Cl. ...................... 700/224; 700/223; 700/229; 700/230; 198/347.1; 198/370.01; 198/370.1; 198/575; 198/720
(58) Field of Search ................................ 700/223, 224, 700/229, 230; 209/583, 584; 198/347.1, 198/370.1, 575, 720

(56) References Cited

U.S. PATENT DOCUMENTS 4,244,672 A * 1/1981 Lund .......................... 198/350
4,915,209 A 4/1990 Canziani
5,150,891 A * 9/1992 Svyatsky et al. ............. 271/35
5,634,562 A 6/1997 Isaacs
5,667,078 A 9/1997 Walach
5,860,504 A 1/1999 Lazzarotti
5,977,501 A 11/1999 Wekheiser et al.
6,082,521 A 7/2000 Maier et al.
6,107,588 A 8/2000 De Leo et al.
6,129,199 A 10/2000 Gretener et al.
6,227,378 B1 * 5/2001 Jones et al. ................. 209/698
6,274,836 B1 8/2001 Walach
6,793,063 B1 * 9/2004 Gillet et al. ................ 198/349
6,808,058 B2 * 10/2004 Shiohara ..................... 198/357

* cited by examiner

*Primary Examiner*—Khoi H. Tran
(74) *Attorney, Agent, or Firm*—Greenblum & Bernstein, P.L.C.

(57) ABSTRACT

A single pass sequencer and method of use for transporting the mail pieces in a single pass through a set of feeders. The system includes a transport system which transports articles to an transport system. At least one staging area stages the articles to be injected onto the transport system. A buffer stores the articles received from the transport system and a loader loads the articles from the buffer onto the transport system at a location downstream from the at least one staging area. A controller is in communication with the at least one staging area, the buffer and the loader. The controller coordinates the loader and the at least one staging area to inject the articles onto the transport system in a delivery point sequence. The controller may instruct the loader to create a gap between the articles loaded thereon in order of articles within the staging area to be inserted within the gap, in a sequence.

24 Claims, 5 Drawing Sheets

SINGLE PASS SEQUENCER AND METHOD OF USE

BACKGROUND OF THE INVENTION

1. Field of the Invention

The invention generally relates to a single pass sequencer and, in particular, to a system and method for sequencing mail pieces in delivery sequence in a single pass system.

2. Background Description

The delivery of mail such as catalogs, products, advertisements and a host of other articles have increased exponentially over the years. These mail pieces are known to be critical to commerce and the underlying economy. It is thus important to commerce and the underlying economy to provide efficient delivery of such mail in both a cost effective and time efficient manner. This includes, for example, arranging randomly deposited mail pieces into a sequential delivery order for delivery to a destination point. By sorting the mail in a sequential order based on destination point, the delivery of mail and other articles can be provided in an orderly and effective manner.

But, the sorting of mail is a very complex, time consuming task. In general, the sorting of mail is processed though many stages, including back end processes, which sort or sequence the mail in delivery order sequence. These processes can either be manual or automated, depending on a host of factors such as, for example, the mail sorting facility, the type of mail to be sorted such as packages, flats, letter and the like.

In general, however, most modem facilities have become automated to a far extent. These automation technologies include, amongst others, letter sorters, parcel sorters, advanced tray conveyors, flat sorters and the like. But, problems still exist using these technologies. For example, currently, it is known to sequence letters using a mail sorter based on, for example, a two pass system.

More specifically, in current sorting processes, a two pass system is used as one method for sorting mail based on delivery destination. In this known process, a multiple pass process of each piece of mail is provided for sorting the mail; that is, the mail pieces, for future delivery, are fed through a feeder twice for sorting purposes. In general, the two pass system requires a first pass for addresses to be read by an optical character reader and assigned a label or destination code. Once the mail pieces are assigned a label or destination code, they are then fed to bins based on one of the numbers of the destination code. The mail pieces are then fed through the feeder a second time, scanned, and sorted based on the second number of the destination code. It is the use of the second number which completes the basis for sorting the mail pieces based on delivery or destination order.

The two pass system may present some shortcomings. For example, the mail pieces are fed through the feeder twice, which may increase the damage to the mail pieces. Second, known optical recognition systems typically have a reliability of approximately 70%; however, by having to read the mail pieces twice, the rate is multiplied by itself dramatically reducing the read rate and thus requiring more manual operations. That is, the read rate is decreased and an operator may have to manually read the destination codes and manually sort the mail when the scanner is unable to accurately read the destination code, address or other information associated with the mail pieces two consecutive times. Additionally, bar code labeling and additional sorting steps involves additional processing time and sorting machine overhead as well as additional operator involvement. This all leads to added costs and processing times.

Lastly, it is known that such systems are typically capable of only processing one type of mail piece, at a time. For example, letters and flats cannot be processed simultaneously. This, again, increases overall overhead costs, processing times and leads to inefficient use of resources.

The invention is designed to overcome one or more of the above shortcomings.

SUMMARY OF THE INVENTION

In a first aspect of the invention, a single pass sequencing system includes a transport system which transports articles and at least one staging area which stages the articles to be injected onto the transport system. A buffer stores the articles received from the transport system and a loader loads the articles from the buffer onto the transport system at a location downstream from the at least one staging area. A controller is in communication with the at least one staging area, the buffer and the loader. The controller coordinates the loader and the at least one staging area to inject the articles onto the transport system in a delivery point sequence. In one embodiment, the controller instructs the loader to create a gap between the articles loaded thereon in order for articles within the staging area to be inserted within the gap, in a sequence.

In another aspect of the invention, the single pass sequencing system has at least one feeder in communication with an outer transport. The feeder randomly places mail pieces onto the outer transport. A plurality of staging areas receives the mail pieces from the outer transport and stages the mail pieces to be injected onto an inner transport. A buffer stores the mail pieces received from the inner transport and a loader loads the articles from the buffer onto the inner transport at a location downstream from the plurality of staging areas. A scanning device reads delivery information associated with the mail pieces and provides this information to a controller. The controller uses this information, amongst other information, in embodiments, to provide control to the plurality of staging areas, the buffer and the loader. The controller coordinates the injection of the mail pieces onto the inner transport from the loader and the plurality of staging areas in a delivery point sequence.

In yet another aspect of the invention, a method of sequencing mail pieces includes the steps of determining information of mail pieces associated with delivery destinations and injects a first set of mail pieces into a mail stream. The method also stores the first set of mail pieces in a buffer received from the mail stream. The other mail pieces are stage downstream from the buffer. The method further includes injecting a determined amount of mail pieces, in a sequence, from the first set of mail pieces into the mail stream based on the information. The method also injects other mail pieces, in sequence with the already injected mail pieces, into the mail stream created by the injecting step and based on the information.

DETAILED DESCRIPTION OF EMBODIMENTS OF THE INVENTION

The invention provides a flexible system and method for sorting objects such as, for example, flats, mail pieces and other products or parts (generally referred to as mail pieces) using a single pass system. In the system and method of the invention, only a single feed or pass is required through a feeder system to order and sequence the mail pieces for future delivery. The system and method of the invention minimizes damage to mail pieces, as well as increases the overall efficiency of the sorting process. The invention is further designed to sort an array of combined types of mail pieces such as flats and letters, together. The invention may be utilized in any known processing facility ranging from, for example, a postal facility to a host of other illustrative facilities. The system and method of the invention may also be implemented in warehouse management systems.

In one implementation, the method and system of the invention is a one-pass sequencer that utilizes known feeders and optical or bar code recognition systems. A discussion of the optical or bar code recognition systems is limited since these are well known in the art. For example, the optical or bar code recognition systems read and then delivery information associated with the mail pieces to a controller having a central processing unit. This information may include, for example, address information including zip code and specific delivery point information in order to sequence the mail pieces. The reading of the information may be via manual operations, in embodiments.

The controller may include a central processing unit, memory and other related hardware used in conjunction with the optical or bar code recognition systems in order to store the delivery information and provide control to the system and method of the invention based on the delivery information and other criteria. For example, the central processing unit or other type of control may be programmed in order to track or monitor the location of the mail pieces as they are ejected from the feeders and fed throughout the system of the invention.

EMBODIMENTS OF THE PRESENT INVENTION

Figure 1:
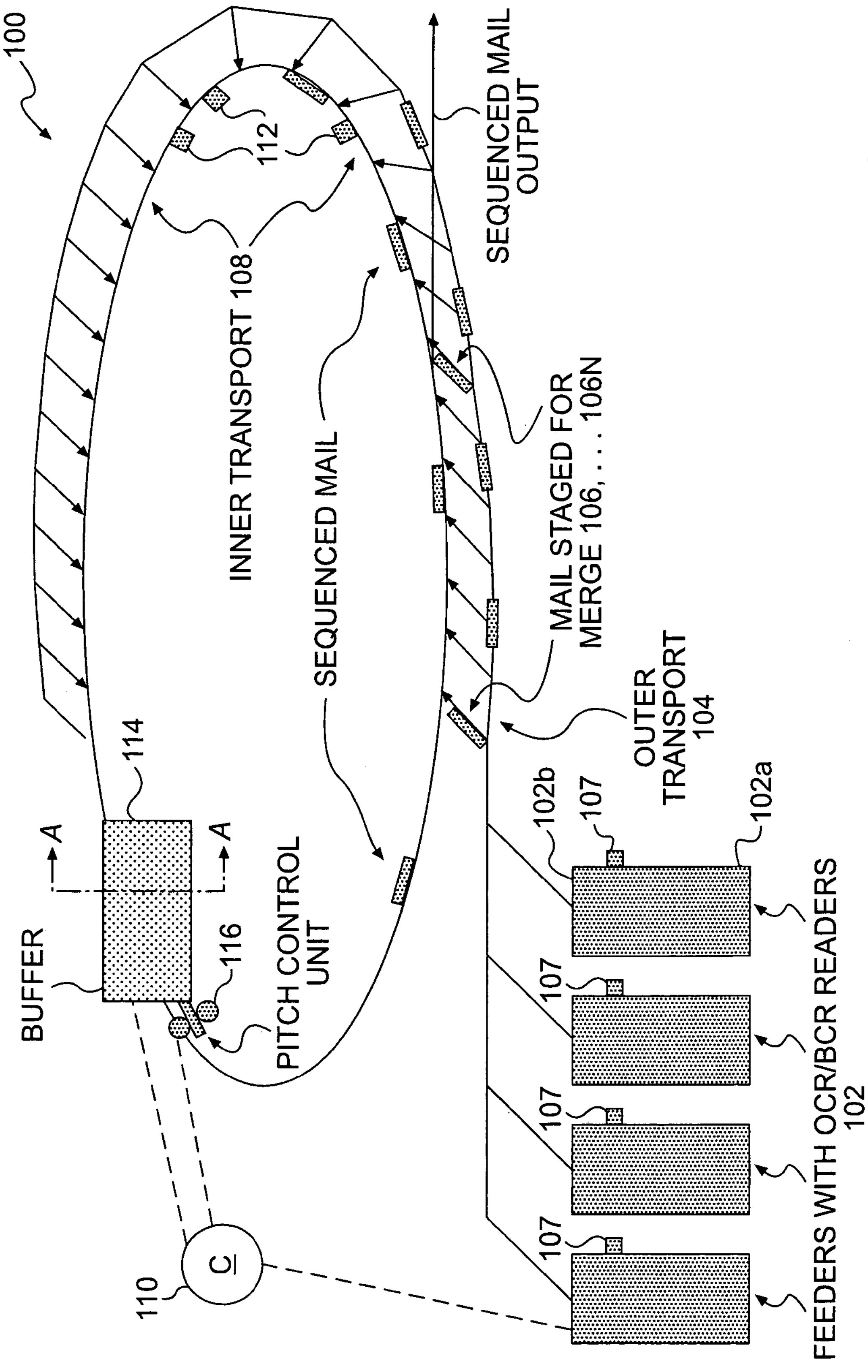
FIG. 1 shows a single pass system in accordance with the invention.

FIG. 1 depicts an overview of the system in accordance with the invention. The sorting mechanism of the invention is generally depicted as reference numeral 100 and includes one or more feeders 102 positioned at a beginning of the process. The feeder(s) 102 may be any known feeder that is capable of transporting mail pieces, flats and the like from a first end 102*a* to a second, remote end 102*b*. In one embodiment, the feeder(s) 102 are capable of feeding a stream of flats at a rate of approximately 10,000 per hour. In another embodiment, the feeder(s) may be capable of feeding a stream of letters at a rate of approximately 40,000 per hour. Of course, those of skill in the art should recognize that other feed rates and combination of feeders, depending on the application, might equally be used with the invention.

A transport system or feed track 104 is positioned downstream from the feeders 102, and preferably at an approximate 90° angle therefrom. This angle minimizes the use of valuable flooring space within the processing facility. The transport system 104 may also be at other angles or orientations (e.g. 0° to 180°), depending on the flooring configuration of the processing facility. The transport system 104 may be a belt driven transport system, well known in the art of integration systems.

A scanning device 107 such as, for example, an optical character recognition device (OCR) or bar code recognition (BCR) system or the like is provided adjacent the transport system 104 or the feeders 102. In embodiments, the OCR/BCR 107 reads the address or other delivery information which is located on the mail pieces. In the case of the OCR, the information on the mail pieces is captured by the OCR and then provided to a sorting computer 110 (e.g., controller), via a communication link, for interpretation and storage therein. Likewise, the information from the BCR will be communicated to the controller 110 for interpretation and storage. The controller 110 will then assign a virtual code to the mail pieces for delivery and sorting purposes based on the delivery information. This may be provided via a look-up table or other known method. The communication link may be provided via an Ethernet, Local Area Network, Wide Area Network, Intranet, Internet, infrared and radio frequency data ports or the like.

Still referring to FIG. 1, a plurality of injection stations 106$_1$ . . . 106$_n$ are positioned along the transport system 104 and are in communication with an inner transport 108. In embodiments, an excess of 100 injection stations for staging the mail pieces for injection into the inner transport 108 may be provided; however, it should be understood that any number of injection stations 106$_1$ . . . 106$_n$ may be provided in implementations of the invention, depending on the desired through put of the system.

In one embodiment, the inner transport 108 is comprised of a plurality of pinch belts formed in a closed loop of any configurable shape such as circular, serpentine and the like. The injection stations 106$_1$ . . . 106$_n$ may also be pinch belts which are capable of transporting the mail pieces from the transport system 104 to the inner transport 108, in any known conventional manner. In one embodiment, the overall length of the inner transport 108 may be upwards of 100 feet with a velocity in the range of approximately 90 inches per second; however, other lengths and velocities may also be implemented with the system, again, depending on the desired through put of the system.

In one implementation, the inner transport 108 may include a plurality of any well known encoders or other sensors (photodiodes, for example) represented as reference numeral 112, in order for the controller to monitor a position of mail pieces on the inner transport 108 with relation to a known location such as, for example, the feeders 102. It should be understood that any number of sensors may be positioned on the inner transport 108, depending on the application of the system.

FIG. 1 further shows a buffer 114 at a position in flow with the inner transport 108, remote from the feeders 102 in the direction of travel. The buffer 114 is adapted for storing the mail pieces, ejected from the inner transport 108, in order to gap the mail pieces for future sequencing, as described in more detail below. In one implementation, the buffer 114 includes a belt which is controlled by the controller 110. At an exit side of the buffer 114 is a pitch control unit 116, which is capable of injecting the mail pieces temporarily stored in the buffer 114, onto the inner transport 108 in a sequenced order, as discussed below. The pitch control unit 116, in one implementation, is comprised of acceleration rollers having a velocity substantially equal to that of the inner transport 108.

Figure 2:
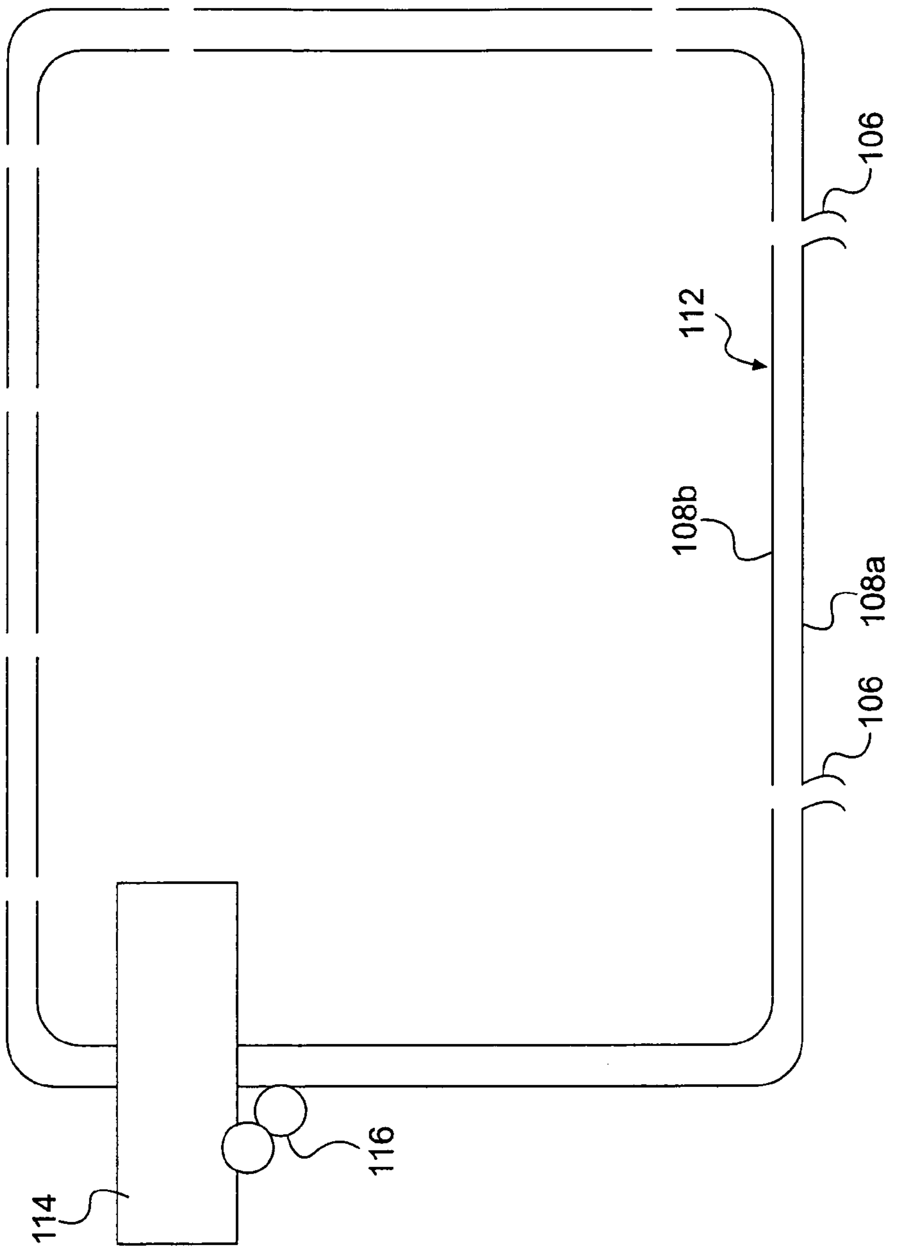
FIG. 2 shows a transport system in accordance with the invention.

FIG. 2 shows a detailed view of the inner transport and the injection stations. As is shown, the inner transport 108 is a vertically oriented pinch belt configuration comprising a first belt 108*a* and a second, opposed belt 108*b*. The belts 108*a* and 108*b* are positioned and tensioned in such a manner that mail pieces, once injected into the inner transport 108, can be transported about the inner transport in a well known manner, e.g., pinching the mail pieces and then moving them via the movement of the belts. In one implementation, several of these belt configurations are contiguously arranged in a closed loop, extending from the feeders 102 to the buffer 114 and then to the feeders 102, again. The injections stations $\mathbf{106}_1 \ldots \mathbf{106}_n$ may, for example, be positioned at open segments of the belts 108*a* and 108*b* for injecting mail pieces onto the inner transport 108. Also, it should be realized that the belts 108*a* and 108*b* may be configured to overlap with one another or formed, in one implementation, partly from a single loop.

The belts 108*a* and 108*b* additionally have associated encoders or other well known sensors (e.g., photodiodes) 112 for tracking the position of the mail pieces on the belts during the sorting and sequencing process. By way of example, a photoelectric sensor may be used with the system of the invention. In this implementation, the photoelectric sensor is adjusted to respond to a pulse of a particular light frequency. That is, the photoelectric sensor is set to switch once it overcomes a certain threshold, e.g., the passing of the mail piece. Thus, in implementation, as the mail pieces pass through the sensor, the light will be blocked, sensing each of the mail pieces. By using the logic programmed in the controller 110, the known injection point of the mail pieces and the position of each sensor, the system and method of the invention can monitor and determine the exact position of each mail piece as it is transported throughout the system and into the buffer, for example.

Figure 3:
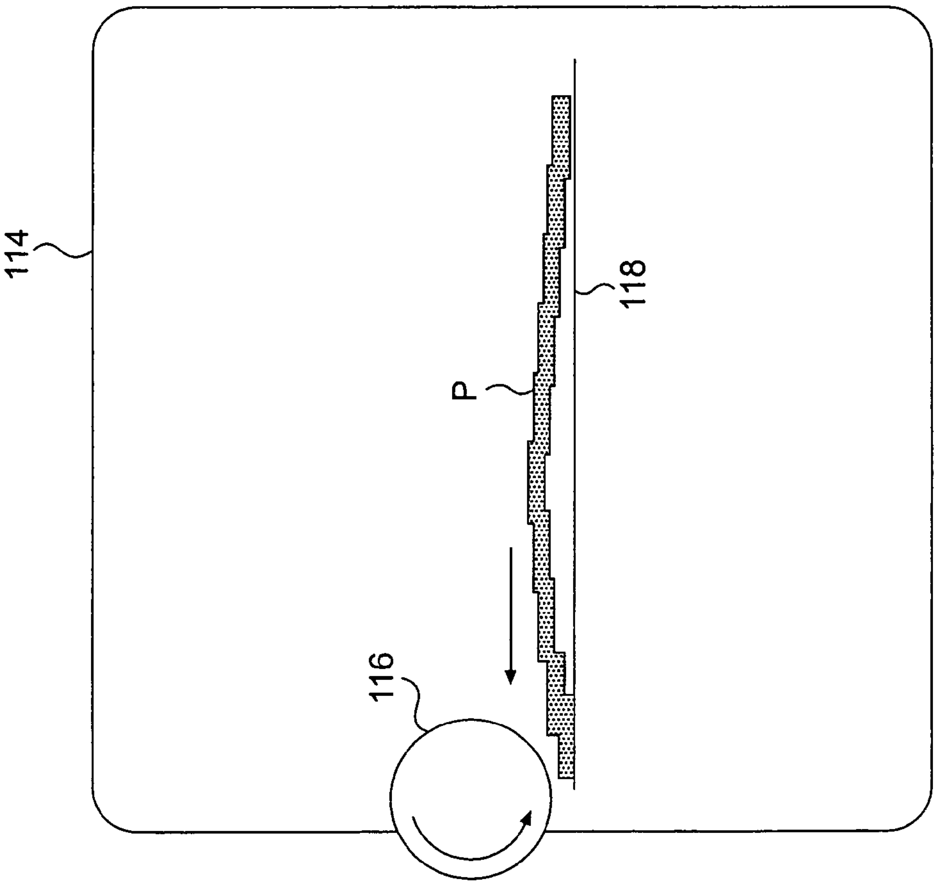
FIG. 3 shows a cut away view along line A—A of a buffer in accordance with the invention.

FIG. 3 is a cut away view of the buffer 114 along line A—A of FIG. 1. In this view, it is shown that the buffer 114 includes a belt or set of actuated roller 118 traveling in a substantially same direction as that of the inner transport 108. In one implementation, though, the belt 118 is driven at a velocity that is less than the velocity of the pitch control unit 116 and the inner transport 108. In one preferred embodiment, the velocity of the belt 118 is approximately 10 times slower than that of the pitch control unit 116, but may be adjustable downwards temporarily to 0 inches per second, i.e., the belt may stop, in order to effectuate the loading of the mail pieces onto the inner transport 108 in a sequenced order. As seen in FIG. 2, the mail pieces P are loaded onto the belt 118, in a "shingled" fashion. That is, the mail pieces are staggered such that approximately one inch of each of the mail pieces are exposed. This allows the pitch control unit 116 to "pick off" each mail piece P for injection onto the inner transport 108.

OPERATION OF USE

In operation, the design of the invention allows the sequencing of different or same types of mail pieces, simultaneously, in a single pass. This reduces exposure to feeder caused damage and provides efficient, timely delivery point operations.

In an example used for illustrative purposes only and not to limit the scope of the invention, the mail stream is first fed through the automated feeders 102 to the transport system 104. The delivery information or image is acquired or read by the OCR/BCR 107 and decoded for its destination information (a code is assigned thereto) via the controller 110. The destination information is stored in the controller 110, preferably within a database. The mail pieces are then transported onto the transport system 104 and injected into the inner transport 108, via the injection stations.

Figure 4:
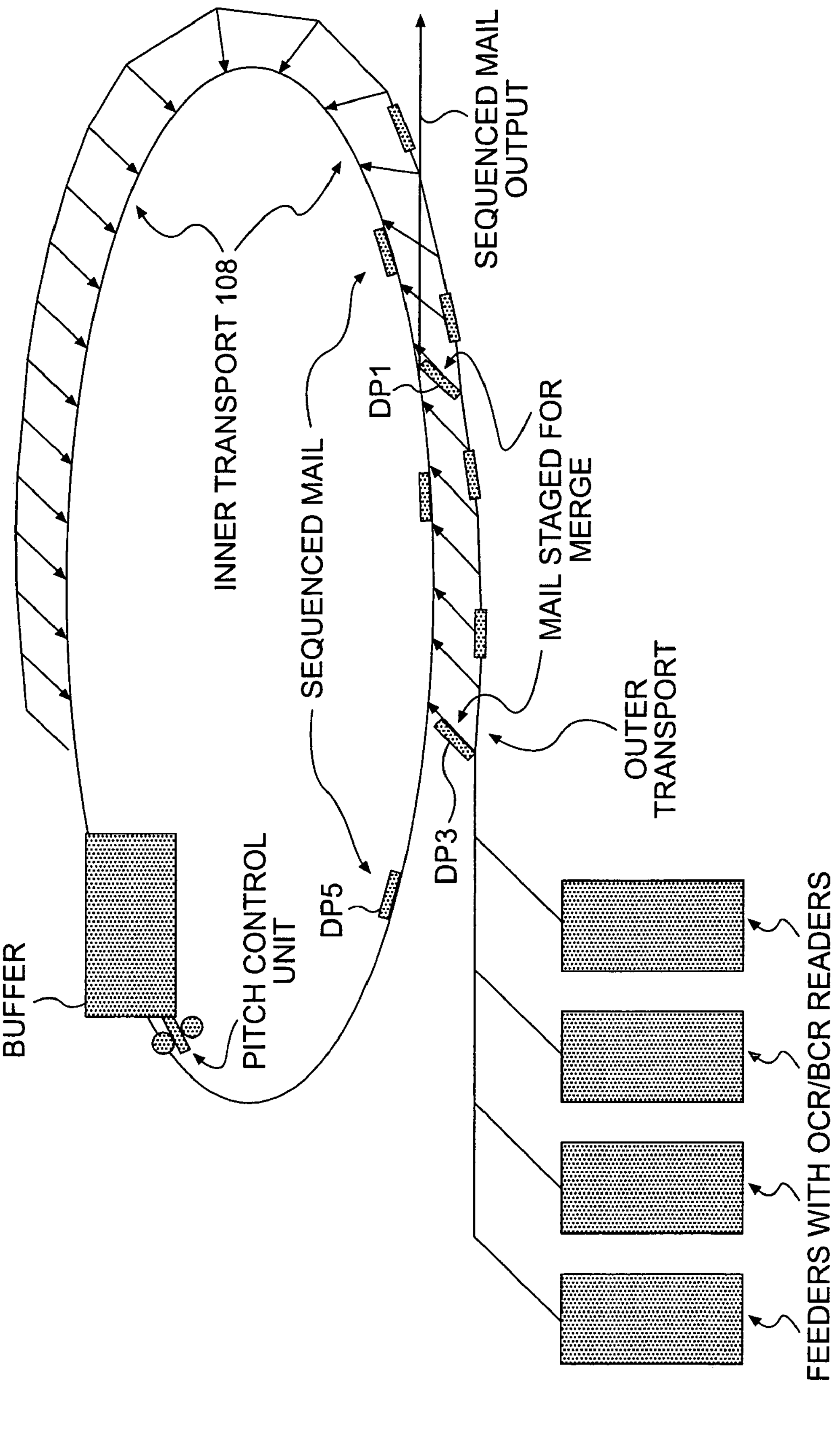
FIG. 4 shows an example of placement of mail pieces in accordance with the invention.

In one implementation, the logic of the controller attempts to initially force the lowest delivery point mail piece into an injection station closest to the feeders. For example, referring to FIG. 4, the mail piece with a delivery point DP1 would be placed at a position furthest from the feeders as compared to the mail piece with a delivery point DP3, which is nearer to the feeders. It should be understood, though, that the mail pieces are ejected from the feeders in a random order such that the lowest mail piece cannot always be forced into the injection station furthest from the feeders. Thus, the illustration of FIG. 4 is provided as an example and should not be interpreted as a limited feature to the invention.

By way of another non-limiting illustrative example, the following sequence of mail pieces may be forced into certain injection stations due to the random order of the mail pieces being ejected from the feeders.

1. Mail piece DP1 is ejected first from one of the feeders and placed in an injection station as far as possible from the feeder;
2. Mail piece DP3 is ejected second from one of the feeders and placed closer to the feeder and, if possible, in an adjacent injection station to DP1; and
3. Mail piece DP2 is ejected third from one of the feeders and placed in a closer injection station.

It should be recognized that the injection stations do not have to be reserved for any mail piece. Also, in embodiments, the injection stations may be segmented such that the higher, medium and lower order mail pieces may be grouped together in the respective segments, with the higher order mail piece segment being closest to the feeders, the medium and lower order mail piece segments being farther away, respectively.

Additionally, DP1, DP2 and DP3 represent the order of the mail pieces, with DP1 being the lowest delivery point and DP3 the highest delivery point. Thus, the controller will attempt to place the mail pieces in an ascending order on the inner transport 108; however, this is not always possible due to the random ordering of the mail pieces ejected from the feeders. In any event, this process, although beneficial in the sorting of the mail pieces, does not require the mail pieces to be placed in an absolute ascending order since the system and method of the invention will still be able to sequence the mail pieces using the buffer and other related processes, as further described.

After the mail pieces are placed in staging or injection sections around the inner transport, the mail pieces are then fed into the inner transport so that the mail pieces are merged into the inner transport mail stream in the proper sequence. However, since the inner transport must make room for mail pieces to be merged, the buffer will accumulate the mail pieces and then feed the mail pieces back onto the inner transport at the proper pitch so a gap is created to allow the merge of another mail piece to enter the sequence from the injection stations. Of course, a gap may not be needed if the mail pieces within the buffer are in sequence and a mail piece to be injected, from the injection stations, would be a mail piece, in sequence, which is before or after the sequence of mail pieces in the stream. Once the "run" is completed the mail pieces are outputted from the inner transport in sequence order ready to be delivered by a postal carrier, for example.

Figure 5:
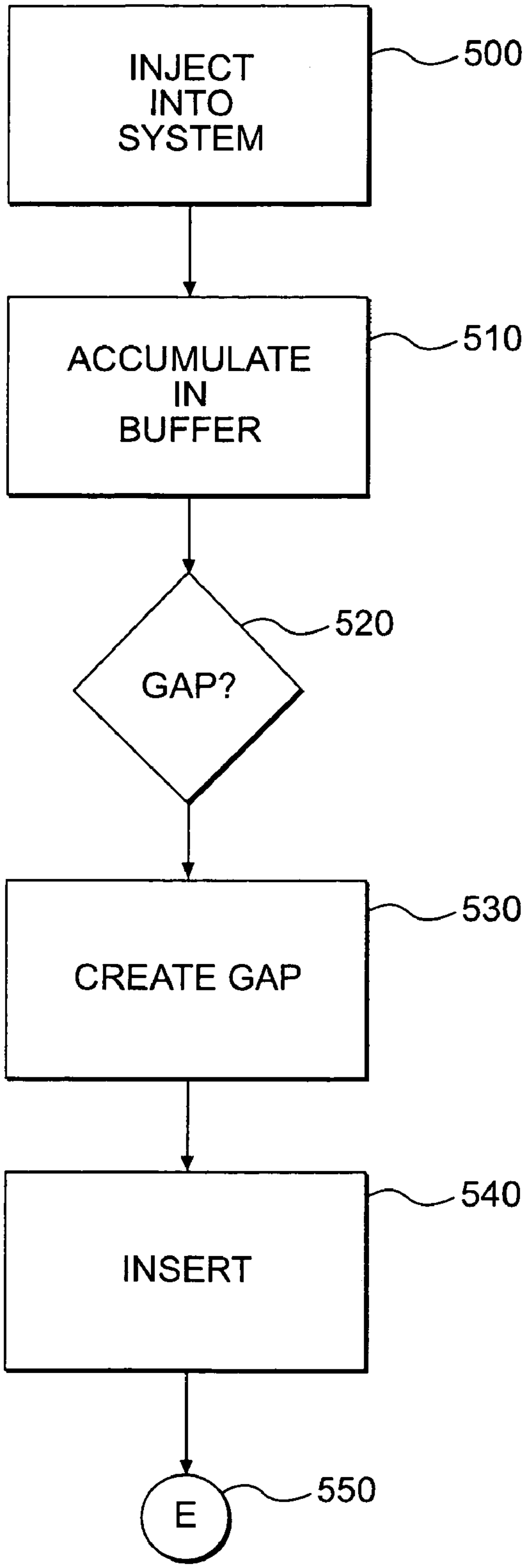
FIG. 5 shows a flow diagram implementing the method of the invention.

FIG. 5 shows a flow of the steps implementing the method of the invention. The steps of the invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). FIG. 5 may equally represent a high level block diagram of the system of the present invention, implementing the steps thereof.

Being more specific as another example, several mail pieces will be initially read and injected into the system at step 500. By way of example, the first mail piece DP1 and the second mail piece DP5 will be injected directly into the inner transport, via the injection stations. In one implementation, the lower delivery point mail piece DP1 will be forced to an injection station farther away from the feeders, with mail piece DP5 injected nearer to the feeders.

The next mail piece now must be inserted into the inner transport under control. For example, if the mail piece were DP3, it would need to be inserted after DP1 has passed the merge point and before DP5 has passed the merge point. If there was a gap between DP1 and DP5, DP3 can then be inserted into the sequence on the inner transport. Mail pieces DP3 should be forced, if possible, to the nearest injection station. Assuming, that DP1, DP3, and DP5 are in the inner transport, the next mail piece may be fed. In this example, mail piece DP6 is the next mail piece in the random order ejected from the feeders.

The mail piece DP6, however, would have to be fed into the inner transport after DP5 but before DP1 passed the merge point. But, as the inner transport fills, the space between mail pieces decreases. Accordingly, the probability that room to insert additional mail pieces in the proper sequence decreases. For this reason the buffer accumulates the mail pieces that were on the inner transport and condenses them in space, at step 510. This can be accomplished by shingling the mail pieces together, as discussed with reference to FIG. 3. In accordance with the invention, as should be understood, under the control of controller, the location and delivery information of each of the mail pieces is known such that the order of the shingled mail pieces in the buffer can be determined for future insertion onto the inner transport.

Knowing the location of each mail piece, and the need for continuing to inject mail pieces from the injection stations to the inner transport, the Pitch Control Unit (PCU) would have advance knowledge, via the controller, of the mail pieces waiting in staging in the buffer and injection stations, as well as the location of each mail piece on the inner transport. The PCU would, at step 520, make a decision where to create a gap between mail pieces on the inner transport so that the next mail piece in the injection station can be inserted, in sequence, with other mail pieces on the inner transport. That is, the PCU would decide, at step 520, to create a gap in the inner transport by determining, not necessarily in the following order:

(i) the delivery or destination information of mail pieces staged at the injections stations, and (ii) the destination information of the mail pieces stacked in the buffer.

By knowing this information, the PCU (via the controller) can determine whether and where a gap needs to be created on the inner transport in order to inject the mail pieces, in sequence, from the injection stations. The gap is created at step 530 by:

(i) feeding one or more mail pieces (which are already in a sequence) onto the inner transport, (ii) waiting for a predetermined amount of time, and (iii) feeding a next mail piece onto the inner transport.

As thus should now be understood, the waiting time would create a gap between two fed mail pieces. The gap, of course, would be created in the proper location so that a new mail piece or pieces waiting in the injection stations can be inserted, in a sequence, between the mail pieces already injected onto the inner transport by the PCU. That is, the mail piece(s) injected from the injection stations would be in sequence between the mail pieces already injected from the buffer. However, a gap may not be needed in all instances.

At step 540, the mail piece at the injection station is now injected into the stream of mail pieces, in sequence. This can be accomplished by monitoring the positions of the mail pieces on the inner transport via the sensors. In an alternative manner, this can be accomplished via the known velocity of the inner transport and the injection time of the mail pieces and gap being created. That is, by knowing the velocity of the inner transport, the time and location of each mail piece as it is injected from the buffer onto the inner transport and the distance between the injection point and the appropriate injection station. This same process would repeat itself until there are no further mail pieces at the injection stations. At this time, all of the mail pieces, in sequence, are injected onto the inner transport and into storage or other bins. The process then ends at step 550.

By way of one illustrative example, the PCU will create a gap on the inner transport in order to insert a mail piece DP5 between mail pieces DP4 and DP6. By way of illustration with mail pieces DP1–DP4 and DP6 shingled together in the buffer, in order, and DP5 at an injection station:

(i) the PCU will determine that DP5 is located at an injection station;

(ii) the PCU will determine that DP1–DP4 and DP6 are in order in the buffer;

(iii) the PCU will eject DP1–DP4 into the stream onto the inner transport;

(iv) the PCU will wait a predetermined period of time to create a gap between DP4 and the next mail piece, DP6;

(v) the system will determine the location of the mail pieces DP1–DP4 and DP6; and (vi) the injection station will eject DP5 into the stream onto the inner transport in the created gap (e.g., insert DP5 into the inner transport after DP4 has passed the merge point (e.g., injection station) but before DP6 has passed the merge point.

Now, mail pieces DP1–DP6 can be transported to the buffer and placed therein in a shingled fashion. It should also be understood that a mail piece designation of "DP" may be associated with one or more mail pieces. Regardless of this, though, the system and method will still work in the same manner. This same process would continue until no further mail pieces are required to be injected into the inner transport and the entire "run" is in sequence.

In another example, a gap may not be needed if mail pieces DP1–DP4 were in the buffer and mail piece DP5 was in a staging area. In this scenario, all of the mail pieces of DP1–DP4 would be injected onto the conveyor without a gap. Next, DP5 mail piece would be injected from the staging area into the stream after the mail pieces of DP1–DP4 have passed the merge point.

While the invention has been described in terms of embodiments, those skilled in the art will recognize that the invention can be practiced with modifications and in the spirit and scope of the appended claims.

Having thus described our invention, what is claim as new and desire by Letters Patent is as follows:

1. A single pass sequencing system, comprising:

a transport system which transports articles;

at least one staging area which stages the articles to be injected onto the transport system;

a buffer which stores the articles received from the transport system;

a loader which loads the articles from the buffer onto the transport system at a location downstream from the at least one staging area; and a controller in communication with the at least one staging area, the buffer and the loader, the controller coordinating the loader and the at least one staging area to inject the articles onto the transport system in a delivery point sequence.

2. The system of claim 1, further comprising:

at least one feeder which feeds the articles in random order onto a feed track, the feed track being in flow communication between the at least one feeder and the at least one staging area and feeding the articles from the at least one feeder to each of the at least one staging area.

3. The system of claim 2, wherein the controller forces the articles having a lowest delivery point address to a staging area of the at least one staging area nearest the at least one feeder.

4. The system of claim 1, wherein:

the buffer includes a belt or actuated rollers for storing and transporting the articles from the transport system to the loader;

the buffer includes a first end and a second end, the articles entering the buffer at the first end and being transported to the second end;

the loader is positioned at the second end to load the articles onto the transport at a location remote from the articles entering the buffer; and the transport system is a plurality of pinch belts.

5. The system of claim 4, wherein the buffer stores and transports the articles in a shingled manner.

6. The system of claim 1, further comprising a scanning device for reading destination information on the articles and providing such information to the controller.

7. The system of claim 6, wherein the scanning device is an optical recognition system or a bar code scanner.

8. The system of claim 1, wherein the controller:

assigns a virtual code to the articles for sorting and sequencing the articles;

monitors the position of the articles within the buffer, on the transport system and within each of the at least one staging area; and instructs the loader and one staging area of the at least one staging area to load the articles onto the transport system, in a sequence, based on the virtual code and a timing of the articles as they pass by the one of the staging areas.

9. The system of claim 8, wherein the controller:

instructs the loader to create a gap between the articles when loading the articles onto the transport system; and instructs the one staging area to inject another article into the gap which is in a sequence with the articles loaded from the loader.

10. The system of claim 1, wherein the controller monitors the location of the articles on the transport system, the buffer and the at least one staging area.

11. The system of claim 1, further comprising a plurality of sensors associated with the transport system to monitor the location of the articles thereon.

12. The system of claim 1, wherein the articles are mail pieces.

13. The system of claim 1, wherein the transport system is a loop.

14. A single pass sequencing system, comprising:

at least one feeder in communication with an outer transport, the at least one feeder randomly placing articles onto the outer transport;

an inner transport;

a plurality of staging areas which receive the articles from the outer transport and stages the articles to be injected onto the inner transport;

a buffer which stores the articles received from the inner transport;

a loader which loads the articles from the buffer onto the inner transport at a location downstream from the plurality of staging areas;

a scanning device which reads delivery information associated with the articles; and a controller in communication with the scanning device and storing the delivery information, and providing control to the plurality of staging areas, the buffer and the loader based on the delivery information, the controller coordinating the injection of the articles onto the inner transport from the loader and the plurality of staging areas in a delivery point sequence.

15. The system of claim 14, wherein the controller further:

forces the articles having a lowest delivery point address to an open staging area furthest from the at least one feeder;

assigns a virtual code to the articles for sorting and sequencing the articles;

monitors the position of the articles within the buffer, on the inner transport and within the plurality of staging areas;

instructs the loader to create a gap between predetermined articles when loading the articles onto the inner transport; and instructs at least one determined staging area of the plurality of staging areas to inject another article into the gap which is in a sequence with the predetermined articles.

16. The system of claim 1, wherein:

the buffer includes a belt or actuated rollers for storing and transporting the articles in a shingled manner received from the inner transport; and the loader is positioned to load the articles onto the inner transport at a location remote from the articles entering the buffer.

17. A method of sequencing mail pieces, comprising the steps of:

determining information of mail pieces associated with delivery destinations;

injecting the mail pieces into a mail stream;

storing the mail pieces in a buffer received from the mail stream;

staging other mail pieces downstream from the buffer;

injecting a determined amount of mail pieces, in a sequence, from the mail pieces into the mail stream based on the information;

injecting another of the mail pieces, in sequence, from the staging into the mail stream created by the injecting step and based on the information.

18. The method of claim 17, further comprising creating a gap between the determined amount of mail pieces prior to injecting the another of the mail pieces into the mail stream.

19. The method of claim 18, wherein the another of the mail pieces is injected into the stream at the gap such that the another of the mail pieces and the determined amount of mail pieces are in sequence of delivery destination.

20. The method of claim 17, further comprising:

monitoring the position of the mail pieces during the storing step and in the mail stream;

creating a gap between the mail pieces when loading into the mail stream; and injecting the another of the mail pieces into the gap which is in a sequence with the mail pieces.

21. The system of claim 1, wherein the loader Is structured and arranged to create a gap that receives an article from the at least one staging area.

22. The system of claim 1, wherein the controller assigns a virtual code to the articles for sorting and sequencing the articles.

23. The method of claim 17, further comprising, before the injecting of another of the mail pieces, creating a gap which receives the another of the mall pieces.

24. The method of claim 17, further comprising assigning a virtual code to the mail pieces in order to sort and sequence the mail pieces.

* * * * *